No. 895,370. PATENTED AUG. 4, 1908.
E. E. HENDERSHOT & G. APGAR.
MEANS FOR ATTACHING POINTS TO TOOLS.
APPLICATION FILED FEB. 25, 1908.

WITNESSES:

INVENTORS:
E. E. Hendershot
G. Apgar
BY
W. J. Fitzgerald & Co
Attorneys

UNITED STATES PATENT OFFICE.

ELMER E. HENDERSHOT AND GEORGE APGAR, OF LEBANON, NEW JERSEY.

MEANS FOR ATTACHING POINTS TO TOOLS.

No. 895,370.  Specification of Letters Patent.  Patented Aug. 4, 1908.

Application filed February 25, 1908. Serial No. 417,717.

*To all whom it may concern:*

Be it known that we, ELMER E. HENDERSHOT and GEORGE APGAR, citizens of the United States, residing at Lebanon, in the county of Hunterdon and State of New Jersey, have invented certain new and useful Improvements in Means for Attaching Points to Tools; and we do hereby declare the following to be a full, clear, and exact description of the invention, such as will enable others skilled in the art to which it appertains to make and use the same.

Our invention relates to new and useful improvements in means for attaching points to picks or other form of tools and our object is to provide means for removably securing the points in position.

A further object is to provide means for reinforcing the points, whereby the strength thereof will be equal to the strength of a point formed integral with the tool and a still further object is to provide means for locking the point in position on the tool.

Other objects and advantages will be hereinafter referred to and more particularly pointed out in the claims.

In the accompanying drawings which are made a part of this application, Figure 1 is an elevation of a pick showing our improved attachment applied thereto. Fig. 2 is a detail perspective view of one end of the pick with the point removed. Fig. 3 is a perspective view of the device adapted to coöperate with that end of the pick shown in Fig.
2. Fig. 4 is a perspective view of the opposite end of the pick, and, Fig. 5 is a perspective view of the device adapted to coöperate with that end of the pick shown in Fig. 4.

Referring to the drawings in which similar reference numerals designate corresponding parts throughout the several views, 1 indicates a pick head, which terminates on opposite sides in tines 2 and 3, this form of tool being particularly applicable in mining and railroad work, in which one of the tines is employed for digging, while the opposite tine is employed for tamping purposes and to this end a sharpened point 4 is secured to the tine 2, while a tamper 5 is secured to the tine 3.

The outer end of the tine 2 is provided with a channel 6, the side walls of which converge towards the closed end of the channel and in this channel is adapted to be seated a shank 7 carried by the point 4, said shank being likewise tapered to fit the converging walls of the channel 6 and as the point, when in use, is more or less dragged through the earth, thereby causing a rearward strain on the point, the side and end walls of the channel 6 are provided with ribs 8, which are adapted to enter seats 9 in the side and end walls of the shank 7, the ribs on the side walls extending longitudinally of the channel, and the rib across the end wall of the channel connecting the two side ribs.

The head 4 extends to each side of the shank 7 to form shoulders 10, which shoulders are adapted to engage the end of the tine 2 at each side of the channel 6 and extending at right angles from the longitudinal plane of the shank 7 and integral with the shoulders 10, are ribs 11, which are adapted to engage seats 12 in the end of the tine 2 and by arranging the ribs and their respective seats in the manner shown, the greatest strength is opposed to the point of greatest strain.

The point 4 is fixed to the tine 2 in any preferred manner, as by introducing a locking bolt 13 through alining openings 14 and 15 in the tine 2 and shank 7, one end of the opening 14 in the tine 2 being threaded to receive the threaded end of the bolt 13 and as said bolt extends laterally through the tine 2 and the interposed portion of the shank 7, it will be readily seen that said point will be securely locked in position on the tine, and if desired, any suitable form of wedge (not shown) may be introduced in alining recesses 16 and 17 in the tine 2 and shank 7, respectively.

When the pick is used for tamping purposes, the major portion of the strain is directed longitudinally of the tine and in securing the tamper thereto, the ribs 18 are extended transversely across the shank 19 and the seats 20 in the walls of the channel 21 are likewise extended vertically of said channel instead of longitudinally thereof, the shank in this instance being entered in the channel by placing the shank above the channel and moving the same downwardly and by inclining the ribs 18 and the seats 20, the shank 19 will gradually move towards the closed end of the shank 6, as the shank is lowered into the channel, the ribs 22 on the shoulders 23 of the tamper 5 entering seats 24 in the end of the tine 3, the inclination of the ribs 18 and seats 20 being such that the ribs 22 will be in position to enter the seats 24 before the shank has moved forwardly a sufficient distance to bind the ribs 22 on the end of the tine 3. After the shank has been seated in the channel 21, a bolt 25 is entered through registering openings 26 and 27 in the tine 3 and shank 19, respectively, thereby securely holding the tamper into engagement with the tine.

It will be clearly understood that while we have shown the point and tamper as used in connection with a pick, said parts may be used in connection with any suitable form of tool or implement and when the tool is to be given a dragging movement or a lateral strain, the ribs and seats are to be constructed as shown in Figs. 4 and 5, but when the strain is directed longitudinally of the implement, the ribs and seats are to be formed as shown in Figs. 2 and 3, thereby opposing the greatest strength of the implement to the point of greatest strain. It will likewise be seen that the points may be readily and quickly attached or removed from the implement and that said parts may be cheaply constructed and further that by removably attaching the points to the tines of the implement, said points may be removed and an additional point attached thereto, whereby the implement may be continued in use while the extra points are being sharpened.

What we claim is:

1. The combination with an implement having a channel therein; of a removable part adapted to be secured to said implement, a shank on said removable part adapted to fit said channel, coöperating ribs and seats in said channel and shank, which ribs and channels are opposed to the greatest strain on the implement and parts attached thereto and means to fix the removable part to the implement.

2. An attachment for an implement of the class described, comprising the combination with the implement having a channel therein, the walls of which are tapered; of a removable point for said implement, a tapered shank on said point adapted to enter said channel, interlocking ribs and seats for said implement and shank and a bolt adapted to lock said shank in said channel.

In testimony whereof we have signed our names to this specification in the presence of two subscribing witnesses.

ELMER E. HENDERSHOT.
GEORGE APGAR.

Witnesses:
JOHN N. HENDERSHOT,
FRANK W. HENDERSHOT.